US011853326B2

(12) United States Patent
Ahmadi et al.

(10) Patent No.: US 11,853,326 B2
(45) Date of Patent: Dec. 26, 2023

(54) DATA WAREHOUSE INDEXED STRING TOKEN SEARCH

(71) Applicant: Google LLC, Mountain View, CA (US)

(72) Inventors: Hossein Ahmadi, Seattle, WA (US); Guang Cheng, Sammamish, WA (US); Yannis Sismanis, Campbell, CA (US); Huong Thi Thu Phan, Kirkland, WA (US); Shiyu Xie, Issaquah, WA (US); Leo Chen, Seattle, WA (US); Zewen Zhang, Kirkland, WA (US); Jing Jing Long, Kirkland, WA (US); Amir Hossein Hormati, Seattle, WA (US)

(73) Assignee: Google LLC, Mountain View, CA (US)

( * ) Notice: Subject to any disclaimer, the term of this patent is extended or adjusted under 35 U.S.C. 154(b) by 176 days.

(21) Appl. No.: 17/501,413

(22) Filed: Oct. 14, 2021

(65) Prior Publication Data

US 2023/0117176 A1    Apr. 20, 2023

(51) Int. Cl.
*G06F 16/248* (2019.01)
*G06F 16/28* (2019.01)
*G06F 16/2457* (2019.01)
*G06F 16/22* (2019.01)

(52) U.S. Cl.
CPC ........ *G06F 16/283* (2019.01); *G06F 16/2282* (2019.01); *G06F 16/248* (2019.01); *G06F 16/24573* (2019.01)

(58) Field of Classification Search
None
See application file for complete search history.

(56) References Cited

U.S. PATENT DOCUMENTS

| 11,663,178 | B2* | 5/2023 | Nara | G06F 16/24573 |
| | | | | 707/692 |
| 2020/0242158 | A1* | 7/2020 | Liu | G06F 16/2282 |
| 2020/0356873 | A1* | 11/2020 | Nawrocke | G06F 11/3409 |
| 2021/0133168 | A1* | 5/2021 | Nara | G06F 11/1453 |
| 2021/0352099 | A1* | 11/2021 | Rogers | G06N 20/00 |
| 2022/0318243 | A1* | 10/2022 | Donjerkovic | G06F 16/2282 |
| 2023/0018975 | A1* | 1/2023 | Sreenivasan | G06F 16/27 |

OTHER PUBLICATIONS

Anonymous. InnoDB Full-Text Indexes. Aug. 2, 2021. 8 pages. Retrieved from the Internet: <https://web.archive.org/web/20210802133318/https://dev.mysql..com/doc/refman/5.6/en/innodb-fulltext-index.html>.
Anonymous. Natural Language Full-Text Searches. Jun. 15, 2021. 6 pages. Retrieved from the Internet: <https://web.archive.org/web/20210615043526/https://dev.mysql.com/doc/refman/5.6/en/fulltext-natural-language.html>.

(Continued)

*Primary Examiner* — Wilson Lee
(74) *Attorney, Agent, or Firm* — Lerner David LLP

(57) ABSTRACT

A technology for retrieving data from a database. The technology includes receiving a search query specifying a target attribute and a target attribute value, accessing an index to determine one or more target files in which the target attribute value appears, the index including a plurality of attribute values, and for each of the attribute values, one or more files in which the attribute value appears, and retrieving data from the one or more target files.

20 Claims, 4 Drawing Sheets

(56) References Cited

OTHER PUBLICATIONS

Chang et al. Bigtable: A Distributed Storage System for Structured Data. Feb. 25, 2019. pp. 205-218. Usenix, The Advanced Computing Systems Association. Retrieved from the Internet: <http://www.usenix.org/event/osdi06/tech/chang/chang.pdf>.

Zobel et al. An Efficient Indexing Technique for Full-Text Database Systems. Aug. 23, 1992. Proceedings of the 18th International Conference on Very Large Data Bases, pp. 352-362.

International Search Report and Written Opinion for International Application No. PCT/US2022/030034 dated Aug. 25, 2022. 15 pages.

* cited by examiner

DATA WAREHOUSE INDEXED STRING TOKEN SEARCH

BACKGROUND

In computer science, searching databases that employ structured storage is a common operation. Accordingly, there is a desire to increase the speed and efficiency of such searches. Of particular interest are database text searches. In this regard, to facilitate text search on structured or semi-structured data, such as columnar databases or relational databases, it is common for a provider to build a custom indexed storage solution that is used to store data and power search queries. However, to perform regular Structured Query Language (SQL) analytics on the data within the custom indexed storage solution the data must be replicated into a traditional data warehouse. Further, while the use of text tokens can increase speed and efficiency of text searches, powering fast text token search queries with a data warehouse that uses columnar storage tuned for scan operations is not possible without employing custom query execution primitives.

BRIEF SUMMARY

It has been recognized that there is a need for technology that can allow for fast token search queries without the need for a custom search system.

Accordingly, the technology of the present disclosure allows for the use of fast token search without the need for custom query execution primitives or data duplication into custom search systems. For example, with the presently disclosed technology a user may employ an SQL scalar function to invoke a tokenized search for a term across multiple columns of a columnar database.

In one aspect, the technology provides a method for retrieving data from a database, including receiving a search query specifying a target attribute and a target attribute value; accessing an index to determine one or more target files in which the target attribute value appears, the index including a plurality of attribute values, and for each of the attribute values, one or more files in which the attribute value appears; and retrieving data from the one or more target files.

In another aspect, the technology provides a system for processing database queries, including a server for receiving a search query specifying a target attribute and a target attribute value, accessing an index to determine one or more target files in which the target attribute value appears, the index including a plurality of attribute values, and for each of the attribute values, one or more files in which the attribute value appears, and retrieving data from the one or more target files.

In still another aspect, the technology provides a non-transitory computer-readable medium having stored thereon computer-readable instructions for controlling receiving a search query specifying a target attribute and a target attribute value; accessing an index to determine one or more target files in which the target attribute value appears, the index including a plurality of attribute values, and for each of the attribute values, one or more files in which the attribute value appears; and retrieving data from the one or more target files.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The presently disclosed technology provides for an increase in the speed and efficiency of database queries while allowing for the use of search query commands in a format that is intuitively consistent to one familiar with current SQL query commands.

Figure 1:
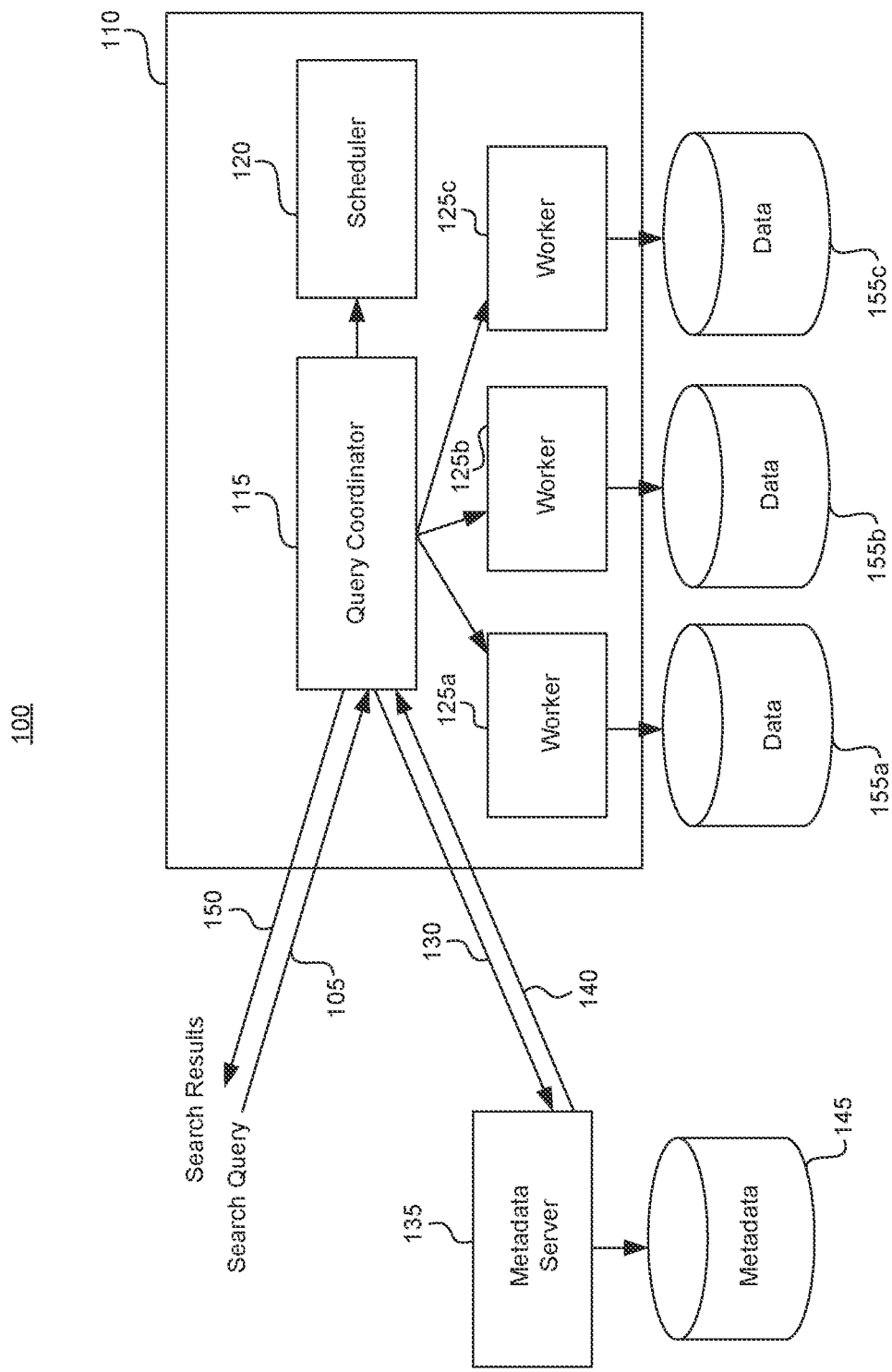
FIG. 1 is a block diagram of a system for processing search queries.

Referring to FIG. 1, the figure is a block diagram of a system 100 for processing search queries in accordance with an embodiment of the presently disclosed technology. As can be seen from the figure, a search query 105 may be received at a query server 110. The query server 110 may or may not be part of a machine cluster, and may include a query coordinator 115, a scheduler 120, and worker modules 125*a*, 125*b*, and 125*c*. The query coordinator 115 receives the search query 105 and coordinates execution of the query, namely determining where the data responsive to the query is located and fetching such data. To determine where the responsive data is located, the query coordinator 115 may generate tokens representing terms in the search query 105 (e.g., by hashing the terms), include the tokens in a request 130, and send the request 130 to a metadata server 135. The metadata server 135 may store an inverted index, and may use the inverted index to cross-reference one or more of the tokens included in the request 130 to locations of the desired data. For example, the metadata server 135 may cross-reference the tokens from the request to one or more files in which data corresponding to the tokens (i.e., the desired data) is present. Upon determining the locations of the desired data, the metadata server 135 may communicate the locations back to the query coordinator 115 via a response 140.

The metadata server 135 may access a metadata storage 145 apart from the metadata server 135 to retrieve, for example, the inverted index used to service the request 130, although such metadata storage 145 is not necessary. For instance, the inverted index may be located in the metadata server 135.

In any event, the query coordinator 115 uses the locations received from the metadata server 135 to retrieve data responsive to the search query 105 and generate search results 150. To retrieve the data, the query coordinator 115 may make use of the scheduler 120 and worker modules 125a, 125b, and 125c. The scheduler 120 may allocate resources for retrieving the data, and the worker modules 125a, 125b, and 125c may perform the retrieval. In the depicted configuration, the worker modules 125a, 125b, and 125c are respectively linked to data storages 155a, 155b, and 155c, although it should be noted that no particular number of data storages is necessary. For example, the worker modules 125a, 125b, and 125c may be linked to a single data storage, or linked to no data storage in a case of the searchable data being stored in the query server 110. Moreover, no particular number of worker modules is necessary, and the three worker modules 125a, 125b, and 125c shown in FIG. 1 are shown merely by way of example.

Having described an illustrative system 100 for processing search queries, the operations for processing search queries will be described in more detail.

Figure 2:
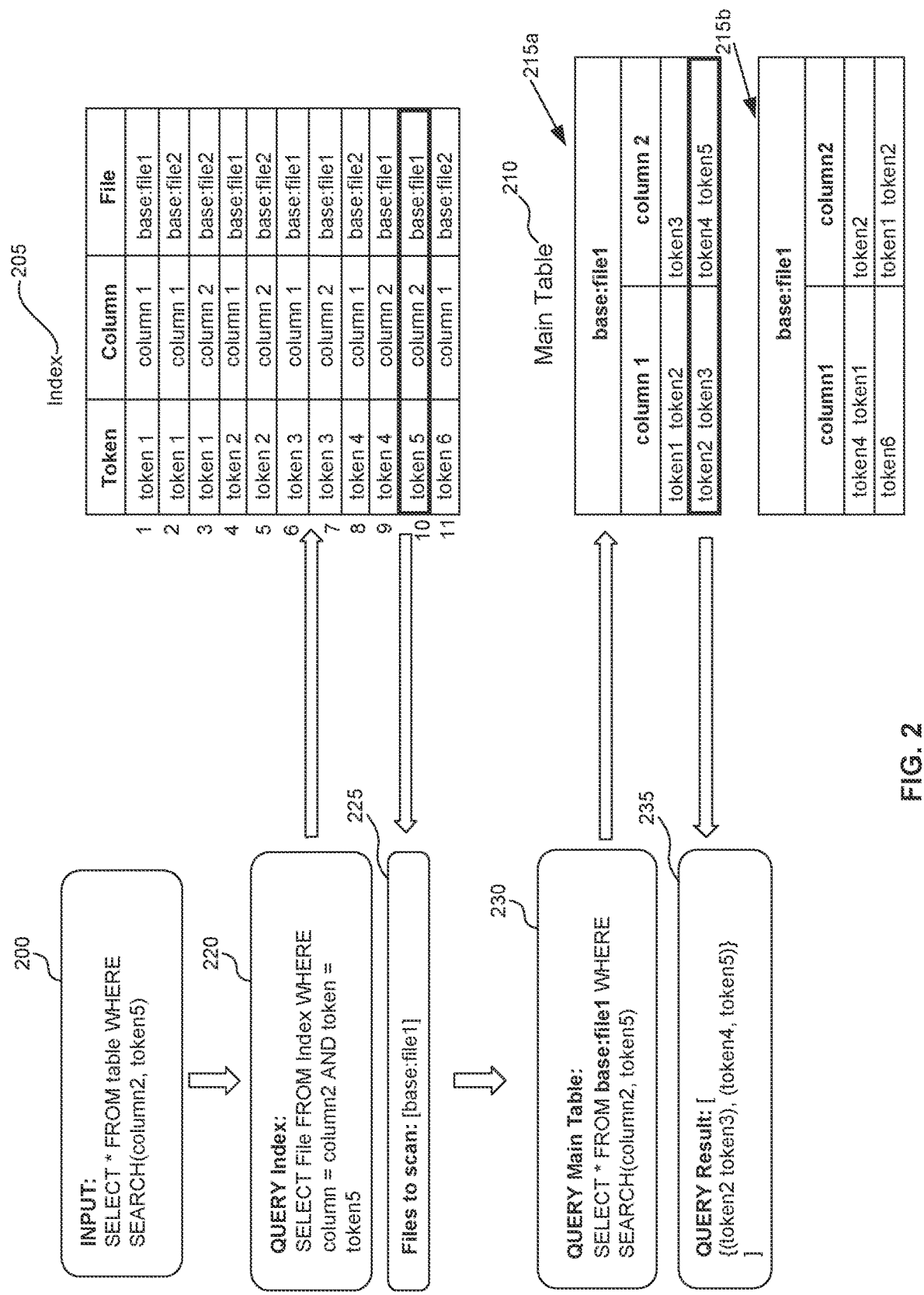
FIG. 2 is a diagram showing the relationship between a search query and an inverted index, and between the search query and a main table made up of base files.

FIG. 2 is a diagram showing the relationship between a search query and an inverted index 205, and between the search query and a main table 210 made up of base files 215a and 215b. Inverted index 205 is sorted by the tokens to enable fast lookup of the index entries matching those tokens. As can be seen from the figure, when a search query is received (reference 200) a process is performed, in which the index 205 is accessed and the main table 210 is accessed. For the search query shown (reference 200), the desired data corresponds to all records of main table 210 in which "column2" includes data (e.g., a search term) corresponding to "token5." However, rather than servicing the search query by simply scanning the entire main table 210 for the presence of data corresponding to "token5" in "column2," the query is serviced by first consulting the index 205 (reference 220) and then scanning portions of main table 210 (reference 230). That is, prior to accessing the main table 210, the process includes first checking index 205 to identify records within index 205 which are designated as records for token5. In the depicted configuration, index 205 is in the form of a table including index rows and index columns, the index columns including a column designated "token," a column designated "column," and a column designated "file." Thus, in the provided example, the 10$^{th}$ row of the index 205 is indicated in response to the search query since the 10$^{th}$ row indicates a column of "column2" and a token of "token5." Further, the 10$^{th}$ row indicates a file of "base:file1," i.e., the first file 215a of main table 210, thereby designating the first file 215a as a file to be scanned (reference 225). Since column2 of the first file 215a is identified from the index, column2 of the first file 215a is scanned to identify records for which column2 includes data corresponding to "token5" (reference 230), and when the record for which column2 includes data corresponding to "token5" is identified, the entirety of the identified record is returned as a query result (reference 235).

In a practical example, the index 205 may be applied to a columnar database storing personal data for many people. In such an example, the personal data may include a row for each person and columns including "name of the person" and "favorite author." In this manner, each row in the columnar database is said to be a record corresponding to a person and each column of the columnar database denotes an attribute that will have an attribute value for each person, one column for the attribute "name of the person" and another column for the attribute "favorite author." Further, the columnar database is divided into files so that some of the records appear in a first file and some of the records appear in a second file.

In the context of the practical example, index 205 is an inverted index for which each row corresponds to an attribute value, the attribute values represented by tokens and listed in the first column of the index 205. The second column of the index 205 lists attributes, the attributes being selected from among the columns of the columnar database, i.e., name of the person or favorite author. The third column of the index 205 lists files, the files being selected from among the files included in the columnar database, i.e., the first file or the second file. Thus, in the practical example, the index 205 includes a row corresponding to each appearance of a given token in a new column/file portion of the columnar database.

Accordingly, applying FIG. 2 to the practical example, the search query (reference 200) may require finding the names of people having a favorite author of "Williams," with "column2" indicating an attribute of favorite author and "token5" indicating "Williams." However, rather than simply scanning column2 of both the first file 215a and the second file 215b for "Williams," the index 205 is first consulted, indicating that the term corresponding to token5 (Williams) appears in column2 (favorite author) only in the first file 215a. Therefore, only the first file 215a needs to be searched. In view of this simple example, one skilled in the art can readily appreciate how use of an inverted index like index 205 greatly reduces the scanning operations necessary to find data in a main table by reducing the number of files that need to be scanned, thereby accelerating the rate at which search queries can be serviced.

It should be noted that the index 205 shown in FIG. 2 is shown for illustrative purposes only. In some embodiments, the index may have more than three columns, or only two columns. In the two column embodiment, the columns may be "token" and "file," and such index may be used to identify files that include a given token in any column.

Figure 3:
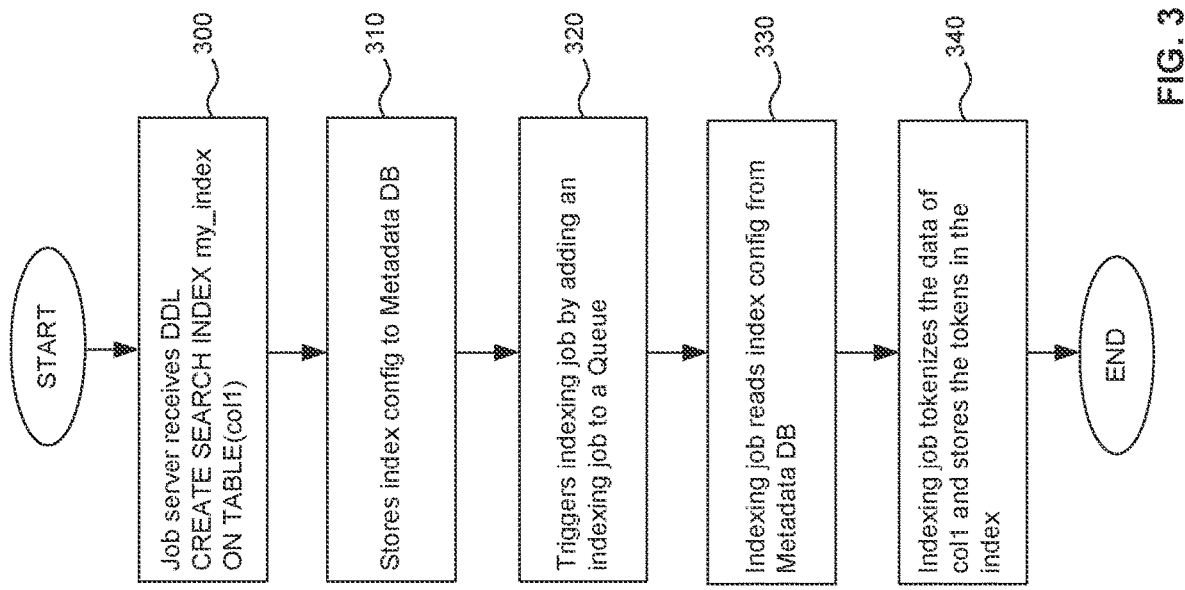
FIG. 3 is a flow chart showing how the inverted index of FIG. 2 may be generated.

One way to generate the index 205 is by using an SQL Data Definition Language (DDL) command, although many alternative ways of generating the index 205 will be apparent in view of the present disclosure. FIG. 3 is a flow chart showing one of the ways the index 205 of FIG. 2 may be generated using an SQL DDL command.

Referring to FIG. 3, creation of the inverted index 205 is initiated through generation of a DDL Create Search Index command which may be received at, for example, the query server 110 (step 300). Any user with appropriate access permissions can enter the DDL Create Search Index command and create an inverted index. Moreover, such command may be entered at any time, and once the inverted index is created any search query may take advantage of the index.

The DDL Create Search Index command specifies the index configuration, and the query server 110 may call the metadata server 135 to store the index configuration in the metadata storage 145 (step 310). In addition, the query server 110 may add an indexing job to a queue (step 320) such that the inverted index 205 will be created in turn. When the indexing job is due for execution, it calls the metadata server 135 to retrieve the index configuration from the metadata storage 145 (step 330); then calls the query server 110 to read and tokenize selected data (e.g., author names) from the table (e.g., main table 210) specified in the index configuration, and cross-reference the resulting tokens with data associated with the selected data to determine in which columns and files each token appears, and stores the result in the inverted index 205 (step 340). In FIG. 3, "col1" refers to one of the columns of the columnar database (e.g., column2 of main table 210), "TABLE" is the columnar database table name, and "TABLE(col1)" indicates that only coi1 from TABLE should be indexed.

By way of example, the tokenization of data may involve generating hashing the data, e.g., hashing author names so that each name is represented by a hash of the name Nevertheless, it should be noted that the present technology may be implemented without tokenization or hashing, e.g., index 205 may be formed by cross-referencing selected data from a table specified in the DDL command to data associated with the selected data to determine in which columns and files the selected data appears—with the selected data in original form.

Figure 4:
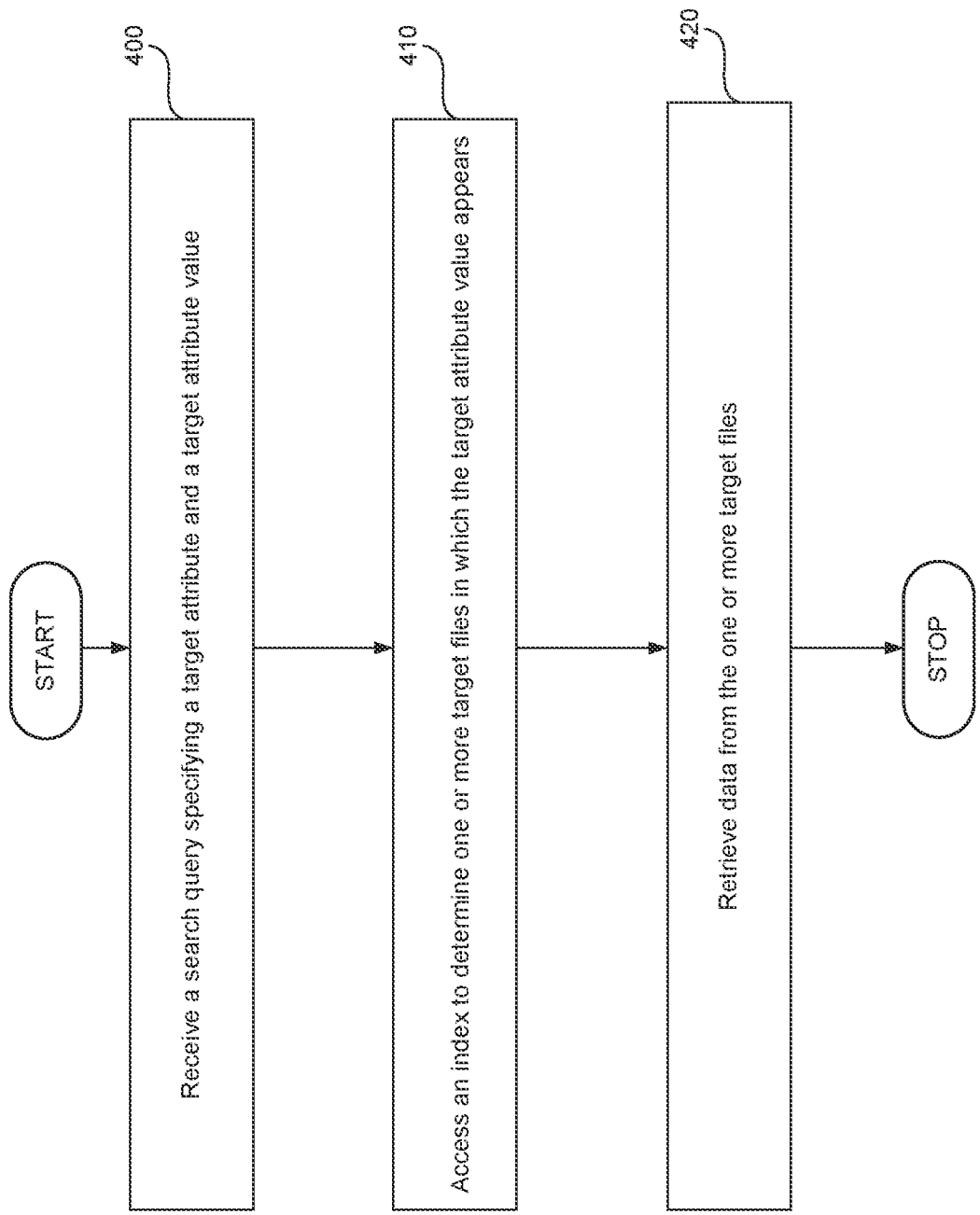
FIG. 4 is a flow chart showing how a search query may be processed.

In any event, after the inverted index 205 is generated, it may be used to accelerate the processing of search queries. FIG. 4 is a flow chart showing an example of how a search query is processed using index 205.

Referring to FIG. 4, processing of a search query may be initiated when the search query is received at the query server 110 (step 400). The received search query may specify a target attribute and a target attribute value. For example, the search query may be in the form of an SQL scalar function and, in keeping with the previously discussed examples, may specify a target attribute of "favorite author" and a target attribute value of "Williams." Next, an inverted index, such as index 205, may be accessed to determine one or more target files in which the target attribute value appears (step 410), and then data may be retrieved from the determined target files (step 420). For example, the determined target files may be searched to identify one or more records that include the target attribute value, and the identified records may be retrieved. In this manner, when the data being searched for a specified attribute value, e.g., favorite author "Williams," includes a multiple of files, but some of the files include no records having the attribute value Williams, the files with no records having the attribute value Williams can be parsed before being searched for the attribute value. Thus, the search for records having the attribute value can be conducted faster as fewer files need to be searched. Thereby, use of the index 205 speeds up the search.

Embodiments of the present technology include, but are not restricted to, the following.

(1) A method for retrieving data from a database, including receiving a search query specifying a target attribute and a target attribute value; accessing an index to determine one or more target files in which the target attribute value appears, the index including a plurality of attribute values, and for each of the attribute values, one or more files in which the attribute value appears; and retrieving data from the one or more target files.

(2) The method according to (1), wherein the one or more target files are in the form of a table having file rows and file-attribute columns, and retrieving includes scanning the file rows of the one or more target files for the target attribute value to determine result-file rows, and retrieving data corresponding to the result-file rows.

(3) The method according to (1), wherein the index is in the form of a table having index rows and index columns, the index columns including an attribute value column indicating an attribute value for each index row and a file column indicating a file for each index row.

(4) The method according to (3), wherein the index columns include an index-attribute column indicating an attribute for each row such that each index row includes an attribute value, an attribute corresponding to the attribute value, and a file in which the attribute value appears.

(5) The method according to (4), wherein the one or more target files are in the form of a table having file rows and file-attribute columns, wherein accessing further includes determining, for each target file, one or more file-attribute columns in which the target attribute value appears, and wherein retrieving includes scanning the file-attribute column(s) for each of the one or more target files for the target attribute value to determine result-file rows, and retrieving data corresponding to the result-file rows.

(6) The method according to (1), wherein the search query is a Structured Query Language (SQL) scalar function.

(7) The method according to (1), wherein the index is a data structure defined by the SQL data definition language.

(8) The method according to (1), further including tokenizing the target attribute value, and wherein the plurality of attribute values included in the index are tokenized attribute values.

(9) A system for processing database queries, including a server for receiving a search query specifying a target attribute and a target attribute value, accessing an index to determine one or more target files in which the target attribute value appears, the index including a plurality of attribute values, and for each of the attribute values, one or more files in which the attribute value appears, and retrieving data from the one or more target files.

(10) The system according to (9), further including a metadata server, and wherein accessing an index includes accessing the metadata server.

(11) The system according to (9), further including a data storage, and wherein retrieving includes accessing the data storage.

(12) The system according to (9), wherein the one or more target files are in the form of a table having file rows and file-attribute columns, and retrieving includes scanning the file rows of the one or more target files for the target attribute value to determine result-file rows, and retrieving data corresponding to the result-file rows.

(13) The system according to (9), wherein the index is in the form of a table having index rows and index columns, the index columns including an attribute value column indicating an attribute value for each index row and a file column indicating a file for each index row.

(14) The system according to (13), wherein the index columns include an index-attribute column indicating an attribute for each row such that each index row includes an attribute value, an attribute corresponding to the attribute value, and a file in which the attribute value appears.

(15) The system according to (14), wherein the one or more target files are in the form of a table having file rows and file-attribute columns, wherein accessing further includes determining, for each target file, one or more file-attribute columns in which the target attribute value appears, and wherein retrieving includes scanning the file-attribute column(s) for each of the one or more target files for the target attribute value to determine result-file rows, and retrieving data corresponding to the result-file rows.

(16) The system according to (9), wherein the search query is a Structured Query Language (SQL) scalar function.

(17) The system according to (9), wherein the index is a data structure defined by the SQL data definition language.

(18) The system according to (9), wherein the server tokenizes the target attribute value, and wherein the plurality of attribute values included in the index are tokenized attribute values.

(19) A non-transitory computer-readable medium having stored thereon computer-readable instructions for controlling receiving a search query specifying a target attribute and a target attribute value; accessing an index to determine one or more target files in which the target attribute value appears, the index including a plurality of attribute values, and for each of the attribute values, one or more files in which the attribute value appears; and retrieving data from the one or more target files.

(20) The medium according to (19), wherein the index is in the form of a table having index rows and index columns, the index columns including an attribute value column indicating an attribute value for each index row and a file column indicating a file for each index row.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A method for retrieving data from an electronic database, comprising:
   receiving, at a first server, a search query specifying a target attribute and a target attribute value;
   accessing, at a second server, by sending a request from the first server to the second sever, an index to determine one or more target files in which the target attribute value appears, wherein the index comprises a plurality of attribute values, and for each of the attribute values, cross-references the attribute value to one or more indications of files in which the attribute value appears and wherein one or more indications of the target files are sent to the first sever in response to the request; and
   retrieving data from the one or more target files.

2. The method according to claim 1, wherein the one or more target files are in the form of a table having file rows and file-attribute columns, and retrieving comprises scanning the file rows of the one or more target files for the target attribute value to determine result-file rows, and retrieving data corresponding to the result-file rows.

3. The method according to claim 1, wherein the index is in the form of a table having index rows and index columns, the index columns including an attribute value column indicating an attribute value for each index row and a file column indicating a file for each index row.

4. The method according to claim 3, wherein the index columns include an index-attribute column indicating an attribute for each row such that each index row includes an attribute value, an attribute corresponding to the attribute value, and a file in which the attribute value appears.

5. The method according to claim 4, wherein the one or more target files are in the form of a table having file rows and file-attribute columns, wherein accessing further comprises determining, for each target file, one or more file-attribute columns in which the target attribute value appears, and wherein retrieving comprises scanning the file-attribute column(s) for each of the one or more target files for the target attribute value to determine result-file rows, and retrieving data corresponding to the result-file rows.

6. The method according to claim 1, wherein the search query is a Structured Query Language (SQL) scalar function.

7. The method according to claim 1, wherein the index is a data structure defined by the SQL data definition language.

8. The method according to claim 1, further comprising tokenizing the target attribute value, and wherein the plurality of attribute values included in the index are tokenized attribute values.

9. A system for processing electronic database queries, comprising a first server for receiving a search query specifying a target attribute and a target attribute value, accessing, at a second server, by sending a request to the second sever, an index to determine one or more target files in which the target attribute value appears, wherein the index comprises a plurality of attribute values, and for each of the attribute values, cross-references the attribute value to one or more indications of files in which the attribute value appears, and wherein one or more indications of the target files are sent to the first sever in response to the request, and retrieving data from the one or more target files.

10. The system according to claim 9, wherein the second server is a metadata server.

11. The system according to claim 9, further comprising a data storage, and wherein retrieving comprises accessing the data storage.

12. The system according to claim 9, wherein the one or more target files are in the form of a table having file rows and file-attribute columns, and retrieving comprises scanning the file rows of the one or more target files for the target attribute value to determine result-file rows, and retrieving data corresponding to the result-file rows.

13. The system according to claim 9, wherein the index is in the form of a table having index rows and index columns, the index columns including an attribute value column indicating an attribute value for each index row and a file column indicating a file for each index row.

14. The system according to claim 13, wherein the index columns include an index-attribute column indicating an attribute for each row such that each index row includes an attribute value, an attribute corresponding to the attribute value, and a file in which the attribute value appears.

15. The system according to claim 14, wherein the one or more target files are in the form of a table having file rows and file-attribute columns, wherein accessing further comprises determining, for each target file, one or more file-attribute columns in which the target attribute value appears, and wherein retrieving comprises scanning the file-attribute column(s) for each of the one or more target files for the target attribute value to determine result-file rows, and retrieving data corresponding to the result-file rows.

16. The system according to claim 9, wherein the search query is a Structured Query Language (SQL) scalar function.

17. The system according to claim 9, wherein the index is a data structure defined by the SQL data definition language.

18. The system according to claim 9, wherein the server tokenizes the target attribute value, and wherein the plurality of attribute values included in the index are tokenized attribute values.

19. A non-transitory computer-readable medium having stored thereon computer-readable instructions for controlling:
- receiving, at a first server, a search query specifying a target attribute and a target attribute value;
- accessing, at a second server, by sending a request from the first server to the second sever, an index to determine one or more target files in which the target attribute value appears, wherein the index comprises a plurality of attribute values, and for each of the attribute values, cross-references the attribute values to one or more indications of files in which the attribute value appears and wherein one or more indications of the target files are sent to the first sever in response to the request; and
- retrieving data from the one or more target files.

20. The medium according to claim 19, wherein the index is in the form of a table having index rows and index columns, the index columns including an attribute value column indicating an attribute value for each index row and a file column indicating a file for each index row.

\* \* \* \* \*